US012666110B2

(12) United States Patent
Chen et al.

(10) Patent No.: US 12,666,110 B2
(45) Date of Patent: Jun. 23, 2026

(54) MEDIA PLAYBACK METHOD FOR IMPROVING PLAYBACK RESPONSE TIME AND RELATED MEDIA PLAYBACK DEVICE

(71) Applicant: Realtek Semiconductor Corp., HsinChu (TW)

(72) Inventors: Chun-Yi Chen, HsinChu (TW); Ching-Yao Yang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 184 days.

(21) Appl. No.: 18/135,728

(22) Filed: Apr. 17, 2023

(65) Prior Publication Data

US 2023/0345078 A1 Oct. 26, 2023

(30) Foreign Application Priority Data

Apr. 22, 2022 (TW) ................................. 111115360

(51) Int. Cl.
*H04N 21/472* (2011.01)
*H04N 7/01* (2006.01)
*H04N 19/159* (2014.01)

(52) U.S. Cl.
CPC ....... *H04N 21/47217* (2013.01); *H04N 7/013* (2013.01); *H04N 19/159* (2014.11)

(58) Field of Classification Search
CPC . H04N 21/47217; H04N 19/159; H04N 7/013
See application file for complete search history.

(56) References Cited

U.S. PATENT DOCUMENTS

| | | | | |
|---|---|---|---|---|
| 2007/0206676 A1* | 9/2007 | Yamazaki | ............ | H04N 19/177 375/E7.199 |
| 2009/0002379 A1* | 1/2009 | Baeza | .................... | H04N 19/42 345/522 |
| 2009/0103892 A1* | 4/2009 | Hirayama | ............ | H04N 9/8205 386/240 |
| 2011/0081965 A1* | 4/2011 | Klein | ...................... | A63F 13/12 463/31 |
| 2012/0028567 A1* | 2/2012 | Marko | ................... | H04H 20/57 455/3.02 |
| 2013/0258054 A1* | 10/2013 | Park | ................... | H04N 21/8547 348/43 |

FOREIGN PATENT DOCUMENTS

| | | |
|---|---|---|
| TW | 578428 | 3/2004 |
| TW | 200737140 | 10/2007 |
| TW | 202027509 A | 7/2020 |

* cited by examiner

*Primary Examiner* — Sunghyoun Park
(74) *Attorney, Agent, or Firm* — Winston Hsu

(57) ABSTRACT
A method for performing media playback on a media playback device, including: receiving a data stream to buffer the data stream in a buffer unit or to record the data stream in a storage unit; performing a parsing operation on the buffered data stream or the recorded data stream to obtain frame time and data offset corresponding to one or more intra-coded pictures of at least one audiovisual (AV) content included in the data stream, thereby to create a frame index table; in response to a playback operation, referring to the frame index table to determine a data offset associated with the playback operation; retrieving one or more data units from the buffer unit or the storage unit according to the data offset; and decoding the one or more data units for media playback.

12 Claims, 7 Drawing Sheets

| | | | | | |
|---|---|---|---|---|---|
| Frame Number | 1 | 2 | 3 | 4 | 5 |
| Frame Type | 1/VPID(3)/APID(3) | 3 | 3 | 2 | 1/VPID(3)/APID(3) |
| Data Offset | 0 | 300 | 500 | 900 | 1200 |
| Frame Time | 0 | 30 | 60 | 90 | 120 |
| Codec Format | 0x21 | | | | 0x21 |
| Frame Rate | 30 | | | | 30 |

FIG. 3A

| Frame Number | 6 | 7 | 8 | 9 | 10 |
|---|---|---|---|---|---|
| Frame Type | 3 | 2 | 3 | 3 | 1/VPID(5)/APID(5) |
| Data Offset | 1250 | 1300 | 1400 | 1500 | 1560 |
| Frame Time | 150 | 180 | 210 | 240 | 270 |
| Codec Format | | | | | 0x11 |
| Frame Rate | 24 | | | | 24 |

FIG. 3B

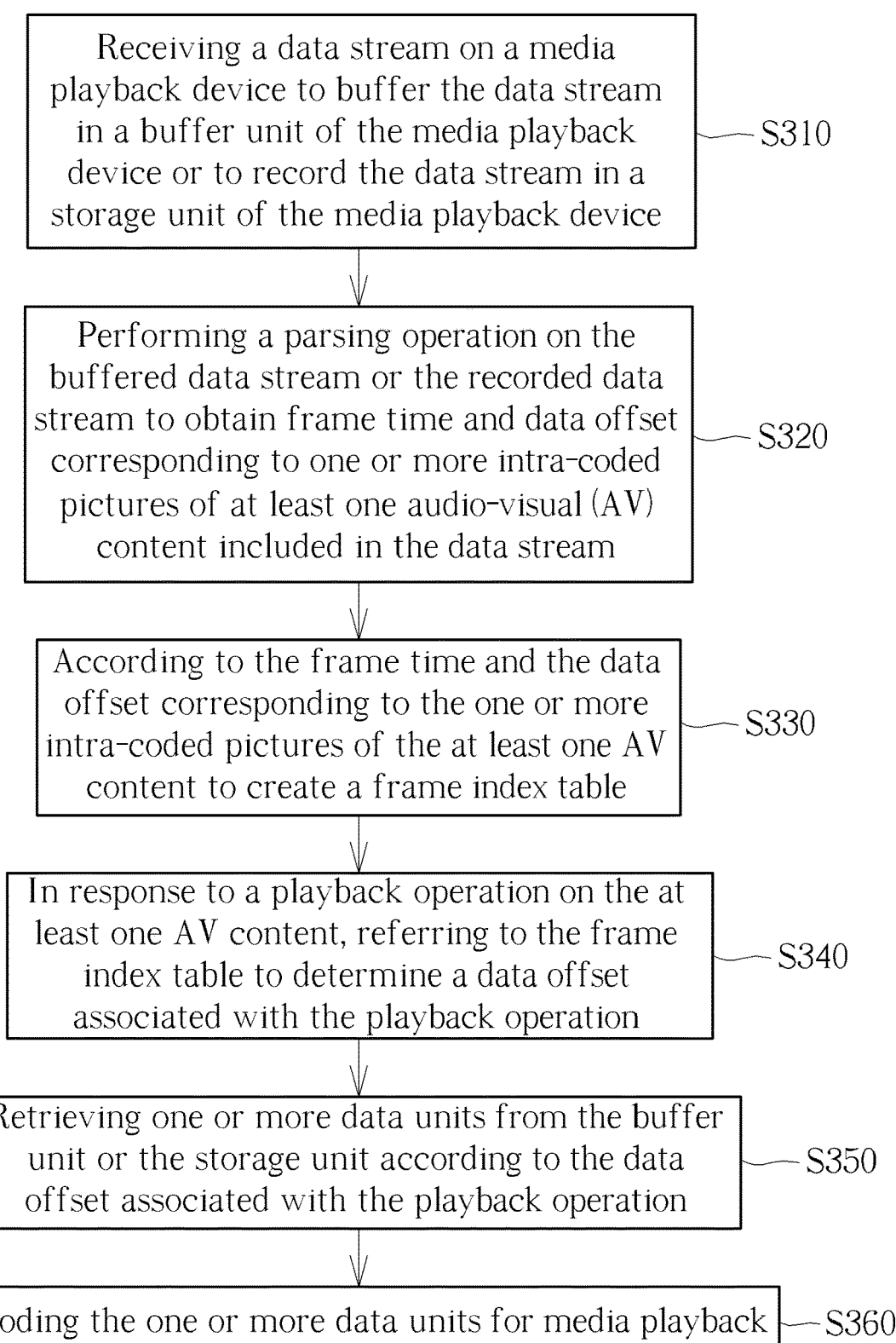

Receiving a data stream on a media playback device to buffer the data stream in a buffer unit of the media playback device or to record the data stream in a storage unit of the media playback device — S310

Performing a parsing operation on the buffered data stream or the recorded data stream to obtain frame time and data offset corresponding to one or more intra-coded pictures of at least one audio-visual (AV) content included in the data stream — S320

According to the frame time and the data offset corresponding to the one or more intra-coded pictures of the at least one AV content to create a frame index table — S330

In response to a playback operation on the at least one AV content, referring to the frame index table to determine a data offset associated with the playback operation — S340

Retrieving one or more data units from the buffer unit or the storage unit according to the data offset associated with the playback operation — S350

Decoding the one or more data units for media playback — S360

MEDIA PLAYBACK METHOD FOR IMPROVING PLAYBACK RESPONSE TIME AND RELATED MEDIA PLAYBACK DEVICE

BACKGROUND OF THE INVENTION

1. Field of the Invention

The present invention relates to media playback, and more particularly, to a media playback method and a media playback device which can improve playback response time by performing pre-parsing operations on data streams.

2. Description of the Prior Art

Generally, a multimedia container includes index information, which describes relationship between specific playback time and data structure of a contained multimedia content. However, a multimedia playback device needs to parse the index information from a starting point of the multimedia content. Unless the parsing operation is close to a target playback time, the multimedia playback device cannot determine in which data unit specific multimedia content associated with the target playback time is stored. On other hand, in the state-of-the-art video encoding standards, group of pictures (GOP) is typically based on IBP structure (i.e., I frame, B frame, and P frame). Before the data unit including intra-coded pictures (i.e., I frame) is obtained, the multimedia playback device is not able to fully decode video content. The multimedia playback device needs the data unit containing the intra-coded picture to decode the video content. This significantly limits a response time of the multimedia playback device to user's playback operations, such as searching, jumping, fast-forwarding, or fast-rewinding. In this way, the user may perceive latency of switching between different audio-visual (AV) contents. Hence, there is a need in the art to provide a solution to improve playback response time, thereby obtaining a decent user experience.

SUMMARY OF THE INVENTION

With this in mind, it is one object of the present invention to provide a media playback method and a related media playback device. In the present invention, once the media playback device receives a data stream comprising audio-visual (AV) content, it pre-parses buffered data stream, and determines frame time and data offset information corresponding to intra-coded pictures of the AV content in the data stream. Based on the frame time and data offset information, the present invention further creates a frame index table. After that, when the user intends to play the AV content, the present invention will load the created frame index table. If the user performs a specific playback control operation, the frame index table is searched to quickly determine storage locations of data units to which intra-coded pictures are included, so as to retrieve the data units for decoding and playback. By using the frame index table, the present invention improves a response time of the media playback device in response to user's playback control operation.

According to one embodiment, a method for performing media playback on a media playback device is provided. The method comprises: receiving a data stream on the media playback device to buffer the data stream in a buffer unit of the media playback device or to record the data stream in a storage unit of the media playback device; performing a parsing operation on the buffered data stream or the recorded data stream to obtain frame time and data offset corresponding to one or more intra-coded pictures of at least one audio-visual (AV) content included in the data stream; according to the frame time and the data offset corresponding the one or more intra-coded pictures of the at least one AV content to create a frame index table corresponding to the at least one AV content; in response to a playback operation on the at least one AV content, referring to the frame index table to determine a data offset associated with the playback operation; retrieving one or more data units from the buffer unit or the storage unit according to the data offset; and decoding the one or more data units for media playback.

According to one embodiment, a media playback device is provided. The media playback device comprises: a receiving and buffering circuit, a parsing and decoding circuit, an index table creation circuit and a playback control circuit. The receiving and buffering circuit is configured to receive a data stream to buffer the data stream in a buffer unit. The parsing and decoding circuit is coupled to the receiving and buffering circuit, and configured to perform a parsing operation on the buffered data stream or the data stream recorded in a storage unit, so as to obtain frame time and data offset corresponding to one or more intra-coded pictures of at least one audio-visual (AV) content included in the data stream. The index table creation circuit is coupled to the parsing and decoding circuit, and configured to create a frame index table that is associated with the at least one AV content, according to the frame time and the data offset corresponding the one or more intra-coded pictures of the at least AV content. The playback control circuit is coupled to the parsing and decoding circuit, and configured to refer to the frame index table to determine a data offset in response to a playback operation and configured to retrieve one or more data units from the buffer unit or the storage unit according to the data offset, wherein the data offset is associated with the playback operation. Specifically, the parsing and decoding circuit is further configured to decode the one or more data units for media playback.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3A and FIG. 3B illustrate a frame index table according to one embodiment of the present invention.

FIG. 5 is a flowchart of a media playback method according to one embodiment of the present invention.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics maybe combined in any suitable combinations and/or sub-combinations in one or more embodiments.

Figure 1:
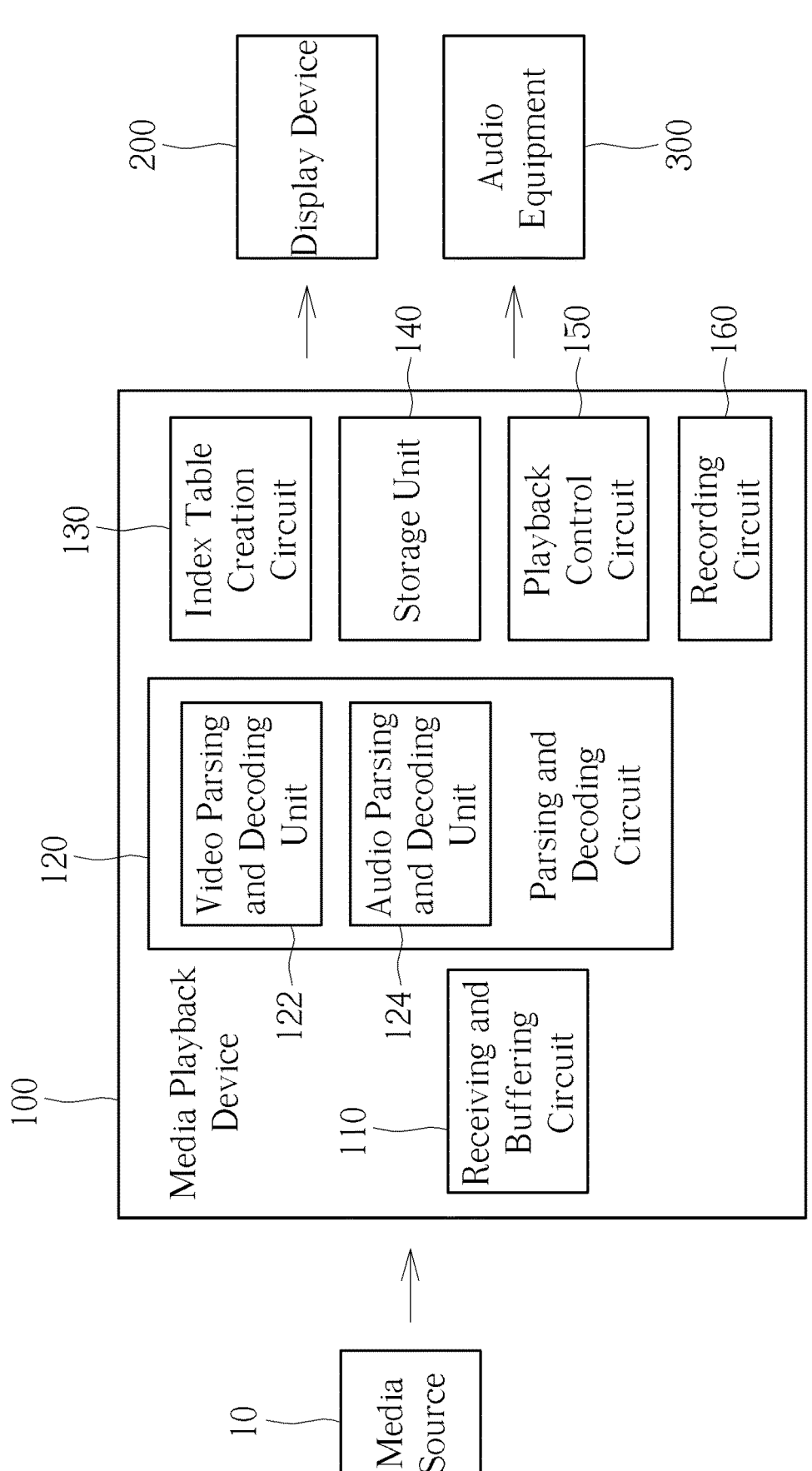
FIG. 1 is a schematic diagram of a media playback device according to one embodiment of the present invention.

FIG. 1 illustrates a schematic diagram of a media playback device in accordance with one embodiment of the present invention. As shown in the figure, a media playback device 100 is configured to receive a data stream from a media source 10 for performing media playback. The media source 10 may be a digital video broadcasting (DVB) service provider, an internet protocol television (IPTV) service provider or an over-the-top (OTT) media services provider, or Internet. In addition, the media playback device 100 can output video/audio signals to a display device 200 and/or audio equipment 300, through a specific video/audio transmission interface, such as High Definition Multimedia Interface (HDMI) or DisplayPort (DP), in a wired or wireless manner, so as to reproduce audio-visual (AV) content on the display device 200 and audio equipment 300. The media playback device 100 includes: a receiving and buffering circuit 110, a parsing and decoding circuit 120 (including a video parsing and decoding unit 122 and an audio parsing and decoding unit 124), an index table creation circuit 130, a storage unit 140, a playback control circuit 150 and a recording circuit 160.

When an user intends to watch certain AV content (e.g., music, films, movies, TV programs, radio programs, etc.), the media playback device 100 will retrieve the AV content from the media source 10, for example, locking a frequency point with which the AV content is associated (if the media source 10 is a DVB service provider), or sending a request to a server (if the media source 10 is an IPTV service provider, an OTT service provider or Internet). The AV content will be transmitted to the media playback device 100 in the form of data stream. The function of the receiving and buffering circuit 110 is to receive the data stream from the media source 10 and buffer the data stream. The data stream may be transmitted, in a wireless or wired manner, from the media source 10 to the media playback device 100, through one or more relay transmission devices. In one embodiment, the data stream may include video contents that are compressed based on a specific video encoding standard, such as Moving Picture Experts Group (MPEG), Advanced Video Coding (AVC), High Efficiency Video Coding (HEVC) or AOMedia Video 1 (AV1). Furthermore, the data stream may include audio contents that are compressed based on a specific audio encoding standard, such as Advanced Codec 3 (AC-3), Moving Picture Experts Group-1 audio layer III or Moving Picture Experts Group-2 audio layer III (i.e., MP3), Advanced Audio Coding (AAC), and MPEG. It should be noted here that video/audio encoding standards used for compressing the video and audio contents in the data stream are not limitations of the present invention. Depending on actual requirements, different video/audio encoding standards may be employed.

Figure 2:
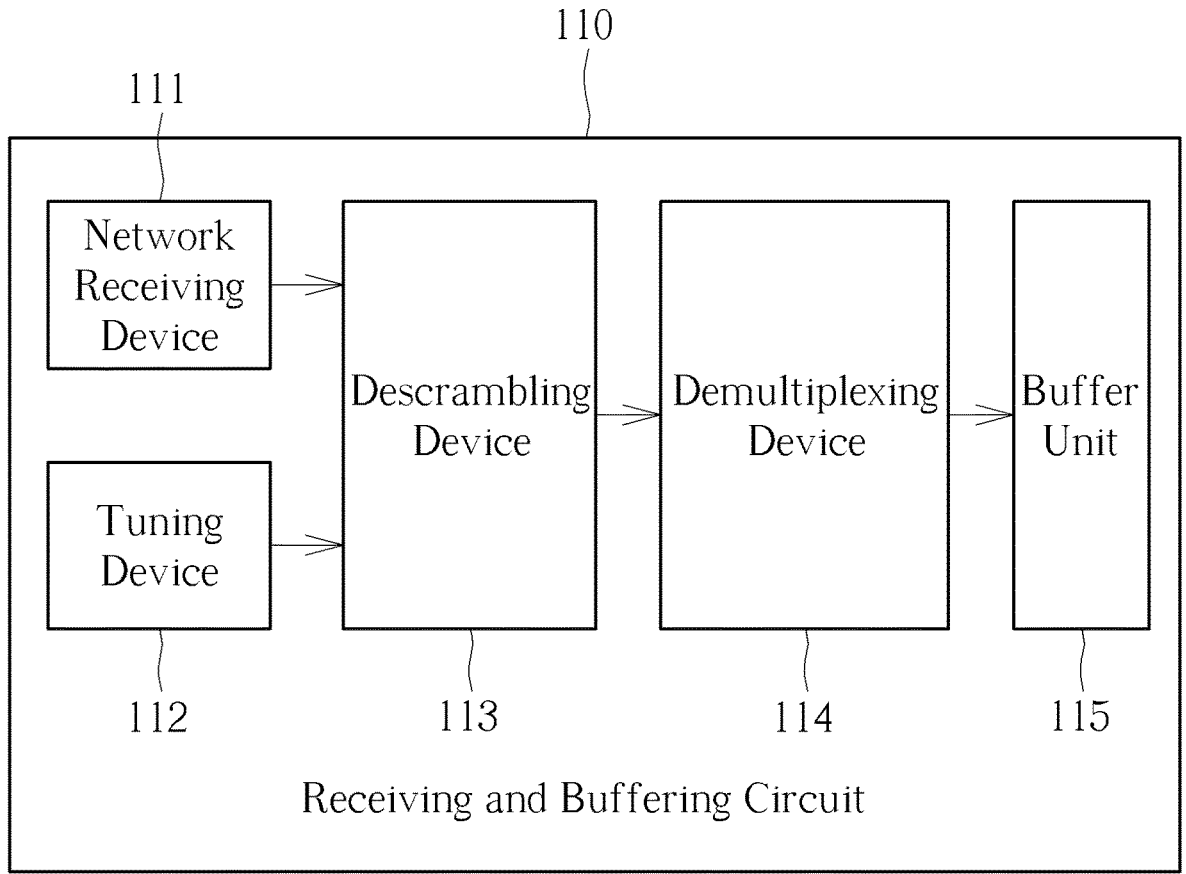
FIG. 2 is a schematic diagram of a receiving and buffering circuit of a media playback device according to one embodiment of the present invention.

FIG. 2 is a schematic diagram of the receiving and buffering circuit 110 in the media playback device 100 according to one embodiment of the present invention. The receiving and buffering circuit 110 includes a network receiving device 111, a tuning device 112, a descrambling device 113, a demultiplexing device 114 and a buffer unit 115. If the media source 10 is an IPTV service, an OTT service or the Internet, the network receiving device 111 is configured to receive the data stream. If the media source 10 is a DVB service provider, the tuning device 112 is configured to receive the data stream. Furthermore, when data units in the data stream has been processed by a scramble procedure, the descrambling device 113 can perform a descramble procedure on the data units to obtain unscrambled data. The demultiplexing device 114 is configured to de-multiplex the data units in the data stream. The data units processed by the descrambling device 113 and the demultiplexing device 114 will be buffered in the buffer unit 115. For more detailed principles and architecture modification of the receiving and buffering circuit 110, please refer to US Patent Application (application Ser. No. 17/319,032).

After the data units of the data stream are stored into the buffer unit 115, the parsing and decoding circuit 120 performs a pre-parsing operation on the buffered data units. According to headers of the data units, the video parsing and decoding unit 122 and the audio parsing and decoding unit 124 are configured to distinguish the AV content included in the data units, and various auxiliary information that is associated with the AV content. In addition, if the media playback device 100 further records the data stream into the storage unit 140 through the recording circuit 160 while receiving the data stream, the video parsing and decoding unit 122 and the audio parsing and decoding unit 124 may also parse the data units stored in the storage unit 140.

Through the pre-parsing operation, information regarding each one of the AV contents included in the data stream can be obtained. For example, a program ID of the AV content can be obtained. Additionally, frame-related information of the AV content, such as, frame type, data offset, codec format and frame rate can also be obtained. Based on the obtained information, the index table creation circuit 130 is configured to create a frame index table as shown in FIG. 3A and FIG. 3B.

As shown by FIG. 3A and FIG. 3B, the frame index table includes multiple fields for recording various types of information, such as, frame type, data offset, frame time, codec format, and frame rate. The field used to record the frame type of a frame may not only record the frame type, but also further record a program identifier of the AV content to which the frame belongs (i.e., video program ID (VPID) and audio program ID(APID)). In one embodiment, if a value of a byte for recording the frame type is 1, it means the frame is an intra-coded picture, such as an "I frame" in H.264 encoding format or HEVC encoding format. If the value of the byte is 2, it means the frame is a predicted-picture, such as "P frame" in H.264 encoding format or HEVC encoding format; and if the value of the byte is 3, it means the frame is a bi-directional predicted picture, such as "B frame" in H.264 encoding format or HEVC encoding format. Please note that, in various embodiments of the present invention, the frame types may be specified by numerical values different from those in the above-mentioned embodiment.

In the frame index table, the field for recording data offset information is mainly used to specify an offset between a data unit (or data units) to which an initial frame (i.e., Frame 1) and a data unit (or data units) to which a specific frame belongs. For example, if data offset information regarding Frame 3 is 500, it means that a data unit to which Frame 3 belongs is located 500 offset units (e.g., bytes) after a data unit to which Frame 1 belongs. If the data offset information of Frame 5 is 1200, this means that a data unit to which Frame 5 belongs is located 1200 bytes after a data unit to which Frame 1 belongs. Please note that, in various embodiments of the present invention, data offset may be recorded in units of different sizes. Although the unit "bytes" is taken as an example in the above description, those skilled in the art should be able to think of using units of different sizes for recording data offset information after fully understanding the concept of the subject application. Furthermore, a data unit may comprise one or more frames depending on its size.

The field for recording frame time information is mainly used to specify a time interval of a specific frame relative to an initial frame (i.e., Frame 1). For example, if time information of Frame 4 is 90, it means a time interval between Frame 4 and Frame 1 would be 90 time units. For example, a time unit could be ⅟₃₀ second. If time information of Frame 8 is 210, it means a time interval between Frame 8 and Frame 1 is 210 time units. Please note that, in various embodiments of the present invention, the frame time information may be recorded in different time units. Although the unit "(⅟₃₀) second" is taken as an example in the above description, those skilled in the art should be able to think of using other time units to record the frame time information after fully understanding the concept of the subject application. Such modifications should fall within the scope of the present invention.

The field for recording codec format information is used to specify a video codec format that is used by each frame and an audio codec format that is used by corresponding audio content. For example, a first byte recorded in this field can be used to specify the video codec format, while a second byte can be used to specify the audio codec format. However, in other embodiments of the present invention, the first byte may be used to specify the audio codec format, while the second byte may be used to specify the video codec format. In one embodiment, when a value of the byte used to specify the video codec format is 1, it means that video codec is an MPG video codec; when the value of the byte used to specify the video codec format is 2, it means the video codec is an AVC codec; when the value of the byte used to specify the video codec format is 3, it means that the video codec is an HEVC or H.265 codec; and when the value of the byte used to specify the video codec format is 4, it means that the video codec is a AV1 codec. Please note that in different embodiments of the present invention, the video codec format may be represented by numerical values different from those mentioned in the above-mentioned embodiments.

In one embodiment, when a value of the byte used to specify the audio codec format is 1, it means the audio codec is an AC-3 codec; when the value of the byte used to specify the audio codec format is 2, it means the audio codec is an MP3 codec; when the value of the byte used to specify the audio codec format is 3, it means the audio codec is an AAC codec; when the value of the byte used to specify the audio codec format is 4, it means the audio codec an MPEG audio codec. Please note that, in different embodiments of the present invention, the audio codec format may be represented by numerical values different from those mentioned in the above-mentioned embodiments.

The field for recording frame rate information is mainly used to specify a frame rate of the AV content to which a frame belongs. For example, if a frame rate of Frame 1 is 30, it means Frame 1 is one of frames of the AV content having the frame rate of 30. If a frame rate of Frame 10 is 24, it means Frame 10 is one of frames of the AV content having the frame rate of 24. In the above cases, Frame 1 may belong to a regular content of a video channel/program, while Frame 10 may belong to an advertising content of the same video channel/program. Hence, these two frames have different frame rates and different video/audio encoder formats, and different video program IDs and audio program IDs.

In addition, although in the embodiment shown in FIG. 3A and FIG. 3B, the frame index table records index information of every frame in the AV content, in other embodiments of the present invention, the frame index table may record index information of intra-coded pictures/I frames only, without recording index information of predicted pictures/P frames, or index information of the bi-directional predicted pictures/B frames. Furthermore, in the embodiments shown in FIG. 3A and FIG. 3B, index information regarding the predicted pictures/P frames and the bi-directional predicted pictures/B frames only include frame time and data offset. This is because rest of the information (e.g., video program ID, audio program ID, video/audio codec format, frame rate) regarding those frames (P frames and B frames) is consistent with their antecedent intra-coded pictures/I frames.

Since the frame index table comprises index information of intra-coded pictures, the media playback device 100 can locate data units having the intra-coded pictures in the buffer unit 115 or the storage unit 140 more quickly by searching the frame index table unit. Therefore, a response time to user's playback control operation can be improved. Furthermore, in one embodiment, the index table creation circuit 130 can name the frame index table with a same main file name of the AV content recorded in the storage unit 140, and store the frame index table in an IDX file format.

After that, once the user again selects and plays a specific AV content that has been buffered in the buffer unit 115 or recorded in the storage unit 140, the playback control circuit 150 of the media playback device 100 will load the a frame index table corresponding to the specific AV content. During the playback, if the user inputs an instruction to the media playback device 100 for performing specific playback operations such as searching, jumping, fast-forwarding or fast-rewinding, the playback control circuit 150 will accordingly determine a target playback time. Based on the target playback time, the playback control circuit 150 searches the frame index table (which may rely on a binary search method), so as to determine a nearest neighbor intra-coded picture. Compared with frame times of other intra-coded pictures, the frame time of the nearest neighbor intra-coded picture is nearest to the target playback time. Next, from the frame index table, the playback control circuit 150 can obtain a data offset of the nearest neighbor intra-coded picture. After the data offset of the nearest neighbor intra-coded picture is obtained, data units having the nearest neighbor intra-coded picture can be obtained from the buffer unit 115 or the storage unit 140 according to the data offset of the nearest neighbor intra-coded picture. The playback control circuit 150 may retrieve one or more data units starting from the data unit specified by the data offset. The retrieved one or more data units will be further decoded by the parsing and decoding circuit 120 to reproduce the nearest neighbor intra-coded picture or pictures after the nearest neighbor intra-coded picture (e.g., predicted pictures or bi-directional predicted pictures).

Figure 4:
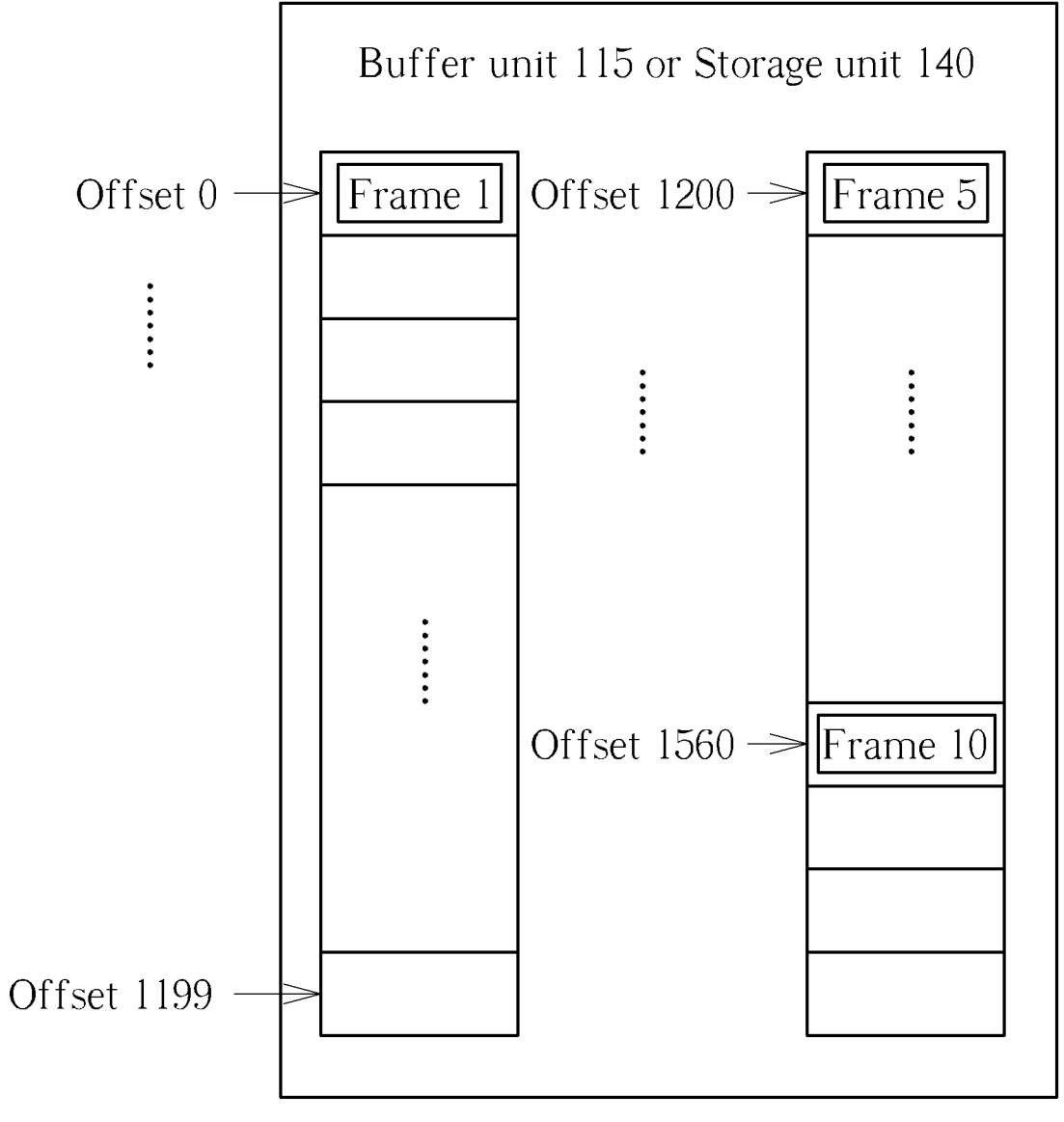
FIG. 4 illustrates relationship between data offsets and data units to which frames belong according to one embodiment of the present invention.

A frame index table shown by FIG. 3A and FIG. 3B will be taken as an example for elaborating how the frame index table is used. For example, when searching, jumping, fast-forwarding or fast-rewinding playback operation inputted by the user is converted into a target playback time 180 by the playback control circuit 150, the playback control circuit 150 can search the frame index table to obtain Frame 5 (i.e., intra-coded picture/I frame) since the frame time 120 of Frame 5 is nearest to the target play time 180. Thus, Frame 5 will be deemed as the nearest neighbor intra-coded picture. Moreover, it can also be derived from the frame index table that the data offset corresponding to Frame 5 is 1200. Accordingly, the media playback device 100 can retrieve one or more data units having Frame 5 from the buffer unit 115 or the storage unit 140, and send the data units to the parsing and decoding circuit 120 to reproduce the AV content. As shown in FIG. 4, starting from the data offset of Offset 0 of Frame 1, the playback control circuit can locate the one or more data units at the data offset of Offset 1200, and send the one or more data units to the parsing and decoding circuit 120 for decoding.

Please note that in the above example, the nearest neighbor intra-coded picture is Frame 5, but Frame 5 is not actually the frame corresponding to the target playback time 180. In fact, Frame 7 has the frame time identical to the target playback time 180. In view of this, Frame 7 should be the target frame. Therefore, in various embodiments of the present invention, several processing modes will be provided for such situation. In a precise display mode, the playback control circuit 150 does not output the nearest neighbor intra-coded picture (Frame 5) to the display device 200, but keeps retrieving more data units from the buffer unit 115 or the storage unit 140. Only after the parsing and decoding circuit 120 decodes to obtain a frame whose frame time is closer to the target playback time (i.e., Frame 7), it starts outputting frames from this frame (i.e., Frame 7), and following frames to the display device 200. Also, the parsing and decoding circuit outputs related audio to the audio equipment 300. It should be noted that, in some embodiments of the present invention, the frame index table does not record frame time and data offset information regarding predicted images/P frames, or bi-directional predicted images/B frames. Hence, in these embodiments, the playback control circuit 150 may obtain such unrecorded information through interpolation. Taking the frame index table of FIG. 3A and FIG. 3B and the target playback time 180 as an example, the nearest neighbor intra-coded picture that is earlier than the target playback time 180 is Frame 5. Frame 5 has the frame time of 120 and the data offset of 1200. On the other hand, the nearest neighbor intra-coded picture that is later than the target playback time 180 is Frame 10. Frame 10 has the frame time of 270, and the data offset of 1560. In addition, the frame rate between Frame 5 and Frame 10 is 30. Therefore, through interpolation, it can be estimated that the frame corresponding to the target playback time 180 is the second frame after Frame 5 (i.e., Frame 7), and its data offset is roughly 1300. Thus, under the precise display mode, the playback control circuit 150 would determine to output Frame 7 (i.e., the target frame) to respond to user's playback control operation. The playback control circuit 150 would start outputting the frames from Frame 7 to the display device 200, and outputting related audio to the audio equipment 300.

In a fast display mode of the present invention, the parsing and decoding circuit 120 responds to the user's playback control operation with a nearest neighbor intra-coded picture (e.g., Frame 5) obtained from the frame index table. That is, the parsing and decoding circuit 120 would start outputting frames to the display device 200 from Frame 5, as well as outputting related audio to the audio equipment 300. According to another embodiment of the present invention, under the fast display mode, after the parsing and decoding circuit 120 obtains a nearest neighbor intra-coded picture (e.g., Frame 5), and a predicted picture (P frame) or a bi-directional predicted picture (B frame) that follows the nearest neighbor intra frame, the parsing and decoding circuit 120 would start outputting frames to the display device 200 from the predicted picture (P frame) or the bi-directional predicted picture (B frame), and outputting related audio to the audio equipment 300.

Please refer to FIG. 5, which illustrates a flow chart of a media playback method according to one embodiment of the present invention. The media playback method comprises following steps:

S310: receiving a data stream on a media playback device to buffer the data stream in a buffer unit of the media playback device or to record the data stream in a storage unit of the media playback device;

S320: performing a parsing operation on the buffered data stream or the recorded data stream to obtain frame time and data offset corresponding to one or more intra-coded pictures of at least one audio-visual (AV) content included in the data stream;

S330: according to the frame time and the data offset corresponding to the one or more intra-coded pictures of the at least one AV content to create a frame index table;

S340: in response to a playback operation on the at least one AV content, referring to the frame index table to determine a data offset associated with the playback operation;

S350: retrieving one or more data units from the buffer unit or the storage unit according to the data offset associated with the playback operation; and S360: decoding the one or more data units for media playback.

Figure 6:
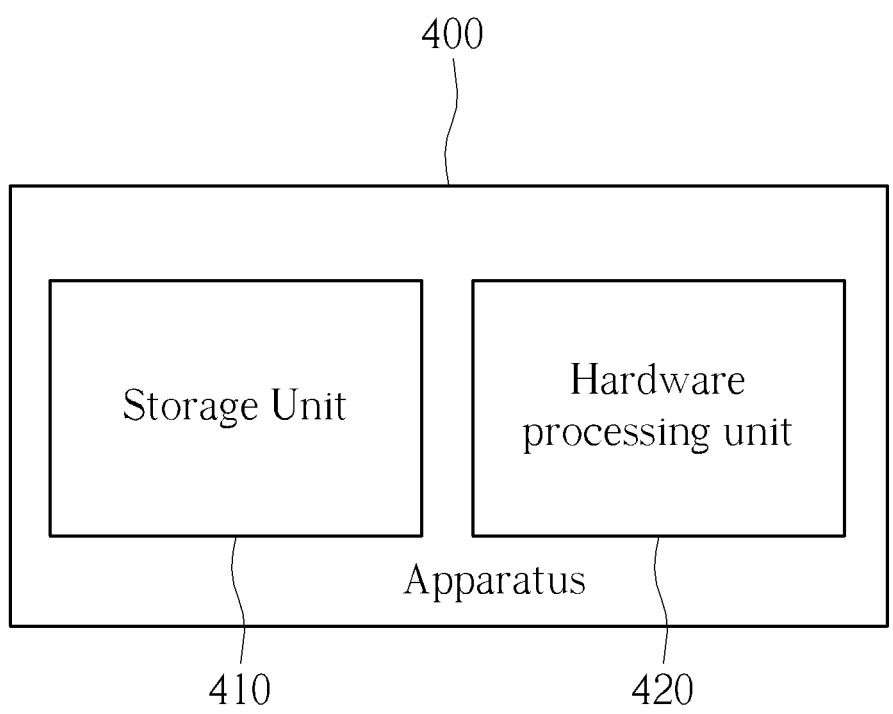
FIG. 6 is a schematic diagram of an apparatus for implementing one or more circuit components or modules in embodiments of the present invention.

Since principles and details of the above steps have been described expressly in aforementioned embodiments, repeated descriptions are omitted here for the sake of brevity. It should be noted that the above flow would achieve better media playback by adding extra steps or making appropriate modification or adjustments, thereby further improving user experience. Furthermore, all or part of operations, circuit components, and modules in the aforementioned embodiments can be implemented by an apparatus 400 shown in FIG. 6. For example, the index table creation circuit 130 and the playback control circuit 150 in the aforementioned media playback device 100 can be implemented by the apparatus 400. A storage unit 410 (e.g., a non-volatile memory) in the apparatus 400 can be used to store program codes, instructions, variables or data. A hardware processing unit 420 (e.g., a general-purpose processor) in the apparatus 400 can execute the program codes and instructions stored in the storage unit 410 and refer to the stored variables or data to perform all the operations in the aforementioned embodiments.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "unit", "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing media playback on a media playback device, comprising:
   receiving a data stream on the media playback device to buffer the data stream in a buffer unit of the media playback device or to record the data stream in a storage unit of the media playback device;
   performing a parsing operation on the buffered data stream or the recorded data stream to obtain frame time and data offset corresponding to one or more intra-coded pictures of at least one audio-visual (AV) content included in the data stream, wherein the frame time directly indicates a time interval between each of the one or more intra-coded pictures and an initial frame of the audio-visual content;
   according to the frame time and the data offset corresponding the one or more intra-coded pictures to create a frame index table corresponding to the at least one AV content, wherein the frame index table records the frame time corresponding to the one or more intra-coded pictures;
   in response to a playback operation that is triggered by user's playback control on the at least one AV content, determining a target playback time;
   searching the frame index table according to the target playback time to determine a data offset associated with the playback operation, comprising:

determining a nearest neighbor intra-coded picture, wherein a difference between the target playback time and a frame time corresponding the nearest neighbor intra-coded picture is smaller than differences between the target playback time and frame times corresponding all the other intra-coded pictures recorded in the frame index table; and
   obtaining the data offset corresponding to the nearest neighbor intra-coded picture from the frame index table;
   retrieving one or more data units from the buffer unit or the storage unit according to the data offset associated with the playback operation, comprising:
   retrieving the one or more data units from the buffer unit or the storage unit according to the data offset corresponding to the nearest neighbor intra-coded picture; and
   decoding the one or more data units for media playback.

2. The method of claim 1, wherein the step of creating the frame index table corresponding to the at least one AV content comprises:
   creating the frame index table according to one or more information of video program identifier, audio program identifier, video codec format, audio codec format, and frame rate, respectively corresponding to the one or more intra-coded pictures.

3. The method of claim 1, further comprising:
   obtaining frame time and data offset respectively corresponding to one or more predicted pictures and/or one or more bi-directional predicted pictures of the at least one AV content; and
   creating the frame index table according to the frame time and the data offset respectively corresponding to the one or more predicted pictures and/or the one or more bi-directional predicted pictures.

4. The method of claim 1, wherein the step of decoding the one or more data units for media playback comprises:
   decoding the one or more data units to obtain the nearest neighbor intra-coded picture, and starting outputting frames to a display device from the nearest neighbor intra-coded picture.

5. The method of claim 1, wherein the step of decoding the one or more data units for media playback comprises:
   decoding the one or more data units to obtain the nearest neighbor intra-coded picture and a predicted picture or a bi-directional predicted picture that follows the nearest neighbor intra-coded picture; and
   start outputting frames to a display device from the predicted picture or the bi-directional predicted picture.

6. The method of claim 1, further comprising:
   determining a target playback time according to the playback operation;
   searching the frame index table to determine a first neighbor intra-coded picture having a frame time earlier than the target playback time;
   determining a target frame corresponding to the target playback time according to a frame rate of the first neighbor intra-coded picture that is recorded in the frame index table; and
   decoding the one or more data units and starting outputting frames to a display device after the target frame is obtained.

7. A media playback device, comprising:
   a receiving and buffering circuit, configured to receive a data stream to buffer the data stream in a buffer unit;
   a parsing and decoding circuit, coupled to the receiving and buffering circuit, configured to perform a parsing operation on the buffered data stream or the data stream recorded in a storage unit, so as to obtain frame time and data offset corresponding to one or more intra-coded pictures of at least one audio-visual (AV) content included in the data stream, wherein the frame time directly indicates a time interval between each of the one or more intra-coded pictures and an initial frame of the audio-visual content;

an index table creation circuit, coupled to the parsing and decoding circuit, configured to create a frame index table that is associated with the at least one AV content, according to the frame time and the data offset corresponding the one or more intra-coded pictures of the at least AV content, wherein the frame index table records the frame time corresponding to the one or more intra-coded pictures; and a playback control circuit, coupled to the parsing and decoding circuit, configured to determine a target playback time in response to a playback operation that is triggered by user' playback control on the at least one AV content, and search the frame index table according to the target playback time to determine a data offset and configured to retrieve one or more data units from the buffer unit or the storage unit according to the data offset associated with the playback operation, wherein the playback control circuit is further configured to:

search the frame index table according to the target playback time to determine a nearest neighbor intra-coded picture, wherein a difference between the target playback time and a frame time corresponding to the nearest neighbor intra-coded picture is smaller than differences between the target playback time and frame times corresponding to all the other intra-coded pictures recorded by the frame index table;

obtain the data offset corresponding to the nearest neighbor intra-coded picture from the frame index table; and retrieve the one or more data units from the buffer unit or the storage unit according to the data offset corresponding to the nearest neighbor intra-coded picture;

wherein the parsing and decoding circuit is further configured to decode the one or more data units for media playback.

8. The media playback device of claim 7, wherein the index table creation circuit is further configured to create the frame index table according to one or more information of video program identifier, audio program identifier, video codec format, audio codec format, and frame rate, respectively corresponding to the one or more intra-coded pictures.

9. The media playback device of claim 7, wherein the parsing and decoding circuit is further configured to perform a parsing operation to obtain frame time and data offset respectively corresponding to one or more predicted pictures and/or one or more bi-directional predicted pictures of the at least one AV content; and the index table creation table is further configured to create the frame index table according to the frame time and the data offset respectively corresponding to the one or more predicted pictures and/or the one or more bi-directional predicted pictures.

10. The media playback device of claim 7, wherein the parsing and decoding circuit is configured to decode the one or more data units to obtain the nearest neighbor intra-coded picture, and start outputting frames to a display device from the nearest neighbor intra-coded picture.

11. The media playback device of claim 7, wherein the parsing and decoding circuit is configured to decode the one or more data units to obtain the nearest neighbor intra-coded picture and a predicted picture or a bi-directional predicted picture that follows the nearest neighbor intra-coded picture; and the parsing and decoding circuit is configured to start outputting frames to a display device from the predicted picture or the bi-directional predicted picture.

12. The media playback device of claim 7, wherein the playback control circuit is configured to determine a target playback time according to the playback operation, and search the frame index table to determine a first neighbor intra-coded picture having a frame time that is earlier than the target playback time; the playback control circuit is configured to determine a target frame corresponding to the target playback time according to a frame rate of the first neighbor intra-coded picture recorded in the frame index table, and the parsing and decoding circuit is configured to decode the one or more data units, and start outputting frames to a display device after the target frame is obtained.

* * * * *